April 29, 1958 — R. M. BALDWIN — 2,832,494

CONDUIT BOX COVER AND LOCATION INDICATOR

Filed March 8, 1957

INVENTOR.
RALPH M. BALDWIN,
BY
McMorrow, Berman & Davidson
ATTORNEYS

2,832,494
CONDUIT BOX COVER AND LOCATION INDICATOR

Ralph M. Baldwin, Clearwater, Fla.

Application March 8, 1957, Serial No. 644,874

2 Claims. (Cl. 220—3.4)

This invention relates to electrical conduit box covers and location indicators.

An object of the invention is to provide a device for covering the open end of an electrical conduit box during the plastering of a wall or ceiling surrounding said box and for marking the location of the box after the plastering operations have been completed.

Another object of the invention is to provide an electrical conduit box cover and location indicator which is easily and quickly attached to a conduit box in advance of plastering operations and easily and quickly removed from the box when the plastering operations have been completed.

Other objects and advantages of the invention will appear in the course of the following description considered in conjunction with the attached drawing, in which.

Figure 1:
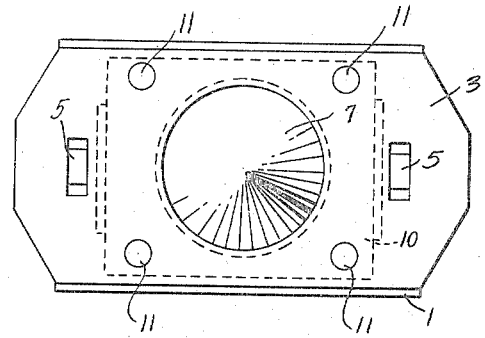
Figure 1 is a plan view of the device of the present invention attached upon a typical wall type conduit box.
Figure 2:
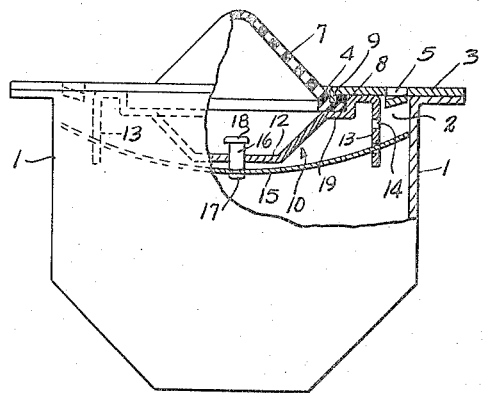
Figure 2 is a side elevational view of the assembly of Figure 1, partially in section.
Figure 3:
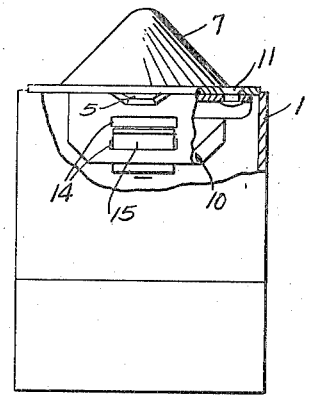
Figure 3 is an end elevational view of the assembly of Figure 1, partially in section.
Figure 4:
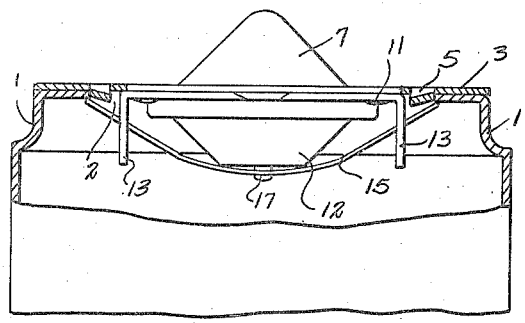
Figure 4 is a side elevational view, partially in section, of the device of the present invention mounted upon a typical ceiling type conduit box.
Figure 5:
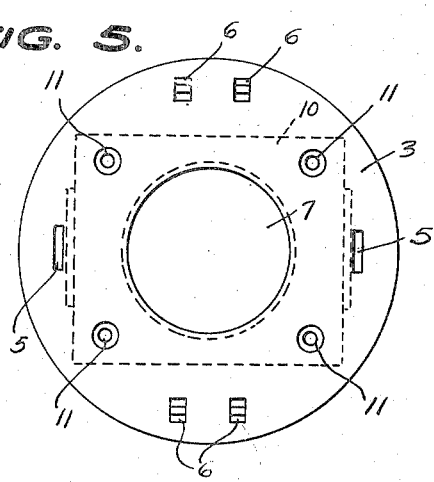
Figure 5 is a plan view of the assembly of Figure 4.

Referring now to the drawing in more detail, numeral 1 designates an electrical conduit box of the type commonly set in a wall or ceiling prior to plastering operations at the points at which electrical outlets or switches are later to be installed. The box shown in Figures 1, 2 and 3 is a typical wall type box and the box shown in Figures 4 and 5 is a typical ceiling type box. Both boxes have an open end 2 in which the cover and location indicator of the present invention is installed.

The cover and indicator of the present invention includes a face plate 3 bridging the open end 2 of the box 1 and having an aperture 4. The plate is also provided with slots 5 of suitable size and shape for the insertion of the end of a screw driver to lift the plate 3 from the box 1. The ceiling type box is also provided with a plurality of pairs of indentations 6 which engage opposed sides of lugs, not shown, on adjacent portions of the box 1 to reinforce the connection of the plate 3 upon the box 1.

A resilient, dome-shaped cap 7 projects from the aperture 4 and has its base connected to the plate 3. The base 8 extends beneath the underside of the portion of the plate 3 surrounding the aperture 4 and has an annular groove in its upper surface which engages an annular ridge 9 upon the lower face of the aperture-surrounding portion of the plate 3.

A retainer plate generally designated 10 is positioned within the box 1 and is attached to the inner face of the plate 3 by means of rivets 11. The retainer plate 10 spans the aperture 4 and has the spanning portion 12 depressed and the end portions 13 bent away from the face plate 3. Each of the end portions 13 is provided with transverse closed slots 14. A shoulder 19 is provided in the retainer plate 10 adjacent the depressed portion 12 for the seating of the base 8 of the cap 7.

A leaf spring 15 is positioned within the box 1 and has each of its end portions slidably supported in an adjacent slot 14 of the retainer plate 10. The ends of the spring 15 are normally in frictional engagement with adjacent portions of the interior wall surfaces of the box 1 to releasably hold the cover and indicator of the present invention in position upon the box 1. A plunger 16 extends transversely and slidably through the depressed portion 12 of the retainer plate 10 and the leaf spring 15 has its intermediate portion fixedly secured to the end 17 of the plunger 16 remote from the aperture 4. Upon the other end of the plunger 16, is means, consisting of a head 18, engageable with the adjacent portion of the cap 7 when the cap 7 is pressed inwardly of the aperture 4 to cause the inward movement of the plunger 16 biasing the ends of the spring 15 out of frictional engagement with the interior wall surfaces of the box 1 and freeing the cover and indicator for removal from the box.

To insert the cover and marker of the present invention in an electric conduit box, the cap 7 is depressed with the finger against the head 18 of the plunger 16, causing the plunger 16 to move slidably inward through the depressed portion 12 of the retainer plate 10 increasing the bowing of the spring 15 and thus decreasing the extent to which the end portions of the spring 15 extend through the apertures 14 in the retainer plate 12. The cover and indicator may then be freely inserted into the open end 2 of the conduit box 1. When the finger is then removed from the cap 7 the spring 15 returns to its normal position and its ends frictionally engage the adjacent portions of the inner wall surfaces of the box 1 holding the cover and indicator securely in place in the box 1. In inserting the device of the present invention in a ceiling type box, care must be taken to engage the indentations 6 with the complemental lugs provided on the sides of the box. In this position the cover and indicator will prevent plaster from entering the box or caking upon the outward flanges of the box when the wall or ceiling in which the box is located is being plastered. After the plastering operations have been completed the cover and indicator can be removed leaving the box and its flanges upon which an electrical outlet or switch is to be secured, free of plaster. To remove the cover and indicator, the cap is again depressed to increase the bow upon the spring 15 and draw its ends out of frictional engagement with the inner surfaces of the wall of the box. The cover and indicator may then be withdrawn from the box. Should it stick, the end of a screwdriver may be inserted in the slot 5 to afford a handle for the device.

What is claimed is:

1. The combination with an electrical conduit box having an open end, of a cover closing the open end of said box and operatively connected to the box, said cover comprising a face plate bridging the open end of said box, said face plate having an aperture, a resilient dome-shaped cap projecting from the aperture and having its base connected to said plate, a retainer plate within said box attached to the inner face of said face plate and spanning said aperture, a leaf spring within said box and having its end portions slidably supported in said retainer plate, the ends of said spring being normally in frictional engagement with adjacent portions of the interior wall surfaces of said box to releasably hold said cover in position upon said box, a plunger extending transversely and slidably through the spanning portion of said retainer plate, said leaf spring having its intermediate portion fixedly secured to the end of said plunger remote from said aperture, and means upon the other end of said plunger engageable with the adjacent portion of said cap when said cap is pressed inwardly of said aperture to bias the ends of said spring out of frictional engagement with the interior wall surfaces of said box.

2. The combination with an electrical conduit box having an open end, of a cover closing the open end of said box and operatively connected to the box, said cover comprising a face plate bridging the open end of said box, said plate having an aperture, a resilient dome-shaped cap projecting from the aperture and having its base connected to said face plate, a retainer plate within said box and attached to the inner face of said face plate and spanning said aperture, said retainer plate having its spanning portion depressed and its end portions bent away from said face plate, each of said end portions being provided with a transverse closed slot, a leaf spring within said box and having its end portions slidably supported in the adjacent slots of said retainer plate, the ends of said spring being normally in frictional engagement with adjacent portions of the interior wall surfaces of said box to releasably hold said cover in position upon said box, a plunger extending transversely and slidably through the spanning portion of said retainer plate, said leaf spring having its intermediate portion fixedly secured to the end of said plunger remote from said aperture, and means upon the other end of said plunger engageable with the adjacent portion of said cap when said cap is pressed inwardly of said aperture to bias the ends of said spring out of frictional engagement with the interior wall surfaces of said box.

References Cited in the file of this patent
UNITED STATES PATENTS

| | | |
|---|---|---|
| 1,015,907 | Ryder | Jan. 30, 1912 |
| 2,204,006 | Allen et al. | June 11, 1940 |
| 2,735,572 | Getz | Feb. 21, 1956 |

FOREIGN PATENTS

| | | |
|---|---|---|
| 212,829 | Germany | July 30, 1909 |